Patented Oct. 7, 1952

2,613,199

UNITED STATES PATENT OFFICE 2,613,199

ELASTIC HYDROCARBONSUBSTITUTED POLYSILOXANES AND ALIPHATIC AZO COMPOUNDS AS CATALYSTS

Philip A. Di Giorgio and Moyer M. Safford, Schenectady, N. Y., assignors to General Electric Company, a corporation of New York No Drawing. Application April 5, 1951, Serial No. 219,527

6 Claims. (Cl. 260—46.5)

1

This invention is concerned with heat convertible compositions of matter and methods of preparing the same. More particularly the invention relates to a composition of matter comprising (1) a polymerized hydrocarbon-substituted polysiloxane containing an average from about 1.95 to 2.1, e. g., from 1.98 to 2.0 hydrocarbon groups per silicon atom, the said hydrocarbon groups being attached to the silicon atoms through C–Si linkages and the said polysiloxane being convertible, for example, by heat to the solid, elastic state, and (2) an aliphatic azo compound present, by weight, in an amount equal to from about 0.1 to 10% of the weight of (1).

Elastomeric compositions of matter comprising heat-converted elastic hydrocarbon-substituted polysiloxanes (commonly known as "silicone rubbers") have found extensive use in applications requiring resistance to elevated temperatures for extended periods of time. Such compositions of matter and methods of preparing the same are more specifically disclosed and claimed in, for example, Wright et al. Patent 2,448,565, Agens Patent 2,448,756, Elliott et al. Patent 2,457,688, and Marsden Patent 2,521,528, all the foregoing applications being assigned to the same assignee as the present invention.

In the foregoing patents particularly in the Wright et al. and the Marsden patents there are disclosed the use of two peroxide catalysts, specifically, benzoyl peroxide or tertiary butyl perbenzoate as catalysts for converting the organopolysiloxane to the solid, elastic, substantially infusible and insoluble state.

We have now discovered that another entirely new class of catalysts can be used to convert organopolysiloxanes containing about 1.95 to 2.0 organic groups, for example, methyl groups, per silicon atom, to the solid elastic state by employing as the cure accelerator an aliphatic azo compound, corresponding to the general formula $$R-N=N-R$$

where both R's are organic radicals and preferably at least one R is an aliphatic radical, for instance, an alkyl radical. This class of catalysts has several advantages over those previously disclosed in the prior art. Thus, the aliphatic azo compounds are easily prepared and are stable. In addition they readily yield free radicals at relatively low temperatures and the rate of production of the free radicals is constant for a wide variety of reaction media. Moreover even the presence of powerful inhibitors, like tetrachloroquinone have little effect on the rate of production of free radicals from these aliphatic azo compounds. As a further advantage, the aliphatic azo compounds in the heat-convertible organopolysiloxane act as efficient photosensitizers in the near ultraviolet and hence may make possible sunlight curing of silicone rubbers. Finally when these aliphatic azo compounds are used as thermal initiators for free radical conversion of the organopolysiloxane, the catalyst fragments remaining in the cured solid elastic product may be less deleterious to the heat-aging properties of the polymer than are the fragments from the usual conventional catalysts employed.

One of the objects of the present invention is to provide a cured solid elastic hydrocarbon substituted polysiloxane containing an average of from about 1.95 to 2.0 hydrocarbon groups per silicon atom (for brevity the aforementioned cured or heat-converted product will hereinafter be referred to as the "synthetic elastomer") using a catalyst other than those employed previously.

Another object of this invention is to provide a method whereby suitable synthetic elastomers may be obtained whose heat aging properties are measurably better than those of polymers obtained by using previously known catalysts.

Other objects of this invention will become apparent from the detailed description which follows. Briefly stated the heat-curable hydrocarbon-substituted polysiloxanes with which this invention is concerned may be described as polysiloxanes consisting of hydrocarbon radicals, and silicon and oxygen atoms having the recurring structural unit

where R' and R'' are the same or different monovalent hydrocarbon radicals, for example, aliphatic radicals, for instance, alkyl radicals, e. g., methyl, ethyl, propyl, isopropyl, butyl, octyl, etc.; unsaturated aliphatic radicals, e. g., allyl, vinyl, etc., radicals; aryl radicals, for instance, phenyl, naphthyl, etc.; aralkyl radicals, for instance, benzyl, phenylethyl, etc.; alkaryl, for instance, tolyl, ethylphenyl, etc., radicals; cyclic radicals, for instance, cyclopentyl, cyclohexyl, etc. Preferably R' and R'' are lower alkyl radicals, more particularly the methyl radical and are the same and may contain a small amount (e. g., 1 to 20 mol per cent) of aryl, for example, phenyl radicals.

A more complete description of the nature of the synthetic starting materials with which our invention is concerned and which may be converted to the vulcanized heat-cured, substantially infusible and insoluble elastomers may be found in the various patents cited previously. These aforementioned patents also contain various methods by which the uncured organopolysiloxane may be obtained from the various liquid non-resinous hydrocarbon-substituted polysiloxane using various condensation catalysts including, for example, iron halides, such as for instance FeCl₃; KOH, NaOH, etc. Other means for preparing the organopolysiloxanes convertible to the solid elastic state are too well known in the art to require further elaboration in the present specification. It is desired to point out that after conversion of the liquid, non-resinous hydrocarbon-substituted polysiloxane to the condensed organopolysiloxane state convertible to the solid, elastic state, the intermediate convertible organopolysiloxane may be a solid somewhat elastic material or gel itself, or it may be in the form of a highly viscous mass which is usually obtained when one condenses a liquid or non-resinous organopolysiloxane containing an average of close to two or exactly two organic groups, for example, methyl groups, per silicon atom using such catalysts as, for example, potassium hydroxide, etc. When the ratio of organic groups to silicon atoms is below two and thus may contain small amounts of copolymerized monoorganosiloxane, for instance, monomethyl siloxane, then the products obtained are usually solid, fusible elastic gels and can be formed by the condensation of the starting liquid material using such catalysts as, for example, potassium hydroxide or ferric chloride. In such cases, the heat-convertible organopolysiloxane may contain an average of from 1.95 up to 2.0 organic groups per silicon atom and may contain up to 0.5 mol per cent copolymerized mono-organosiloxane, for example, monomethyl siloxane. Our invention is intended to embrace all organopolysiloxanes convertible to the solid elastic state and containing at least 1.95 organic groups per silicon atom and wherein the organopolysiloxane comprises at least 95 per cent and preferably 99.8 per cent of the recurring structural unit $$\begin{array}{c} R' \\ | \\ Si-O \\ | \\ R'' \end{array}$$

mentioned above where R' and R'' have the meanings given previously, preferably methyl groups.

In the preferred embodiments of our invention, the solid, elastic, curable, that is, heat-convertible polymerized hydrocarbon-substituted polysiloxane is one in which the average ratio of hydrocarbon groups to silicon atoms ranges from about 1.95 to 2.0 hydrocarbon groups per silicon atom, and where at least 90% of the silicon atoms have two hydrocarbon radicals attached thereto, the remaining 10% or less of the silicon atoms having from 1 to 3 hydrocarbon radicals attached to the silicon atoms so that the overall ratio of hydrocarbon radicals to silicon atoms in the entire hydrocarbon-substituted polysiloxane is still within the range of 1.95 to 2.0, preferably from 1.98 to 2.0 hydrocarbon groups (e. g., methyl) radicals per silicon atoms. In the preparation of the convertible organopolysiloxanes, we prefer to start with a liquid polymeric dihydrocarbon-substituted siloxane (e. g., polymeric dimethylsiloxane) containing up to 2 mol per cent and preferably free of any amount of copolymerized monohydrocarbon-substituted siloxane (e. g., monomethylsiloxane) as disclosed more fully in the previously mentioned patents of Agens, Wright et al., and Marsden.

Of general applicability in the practice of this invention are azo compounds which have an acyclic azo, —N=N—, group bonded to different carbon atoms which are non-aromatic, that is, aliphatic or cycloaliphatic, preferably aliphatic in character at least one of the aliphatic carbons being a tertiary carbon. The preferred catalysts in this class of azo compounds are those in which the tertiary carbon has attached to it through carbon a radical in which the three remaining valences of the carbon are satisfied by at least one element of atomic number 7 or 8 (oxygen and/or nitrogen). Symmetrical azo compounds having two tertiary carbon atoms attached to the azo nitrogens and having as the negative group attached to the tertiary carbons, a nitrile, carbonamide, or carbalkoxy group have increased activity at lower temperatures and therefore are preferred. The negative radical in general is neutral with respect to acidity, and of these neutral radicals the nitrile is preferred because the azonitriles are readily obtained and have high activity.

Among the aliphatic azo compounds which may be employed in the practice of this invention may be mentioned for example azo methane (CH₃—N=N—CH₃) azo-acetonitrile (CN—CH₂—N=N—CH₂CN)

2-azo-bis-isobutyronitrile

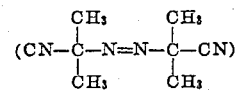

2-azo-bis-ethylisobutyrate

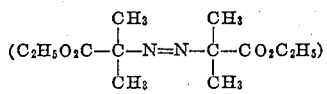

etc. Further examples of aliphatic azo compounds and methods of preparing the same are more particularly disclosed in Hunt Patent 2,471,959, issued May 31, 1949. By reference this patent is made a part of the present disclosures in the instant application.

One class of azo compounds which may be advantageously employed is that corresponding to the general formula

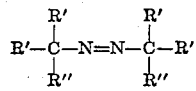

in which R' may be the same or different and may be hydrogen or a monovalent hydrocarbon radical, and R'' may be the same or different and may be the same as R' or in addition may be a monovalent functional group, e. g., —CN, —COOH, COOCH₂R' where R' has the meaning above, —CONH₂, etc.

In order to prepare a synthetic elastomer from the starting convertible organopolysiloxane, the latter may be worked on ordinary mixing or differential rubber rolls until the desired consistency is obtained. The aliphatic azo compound and if desired the filler may be added during this operation. After being formed to the desired shape and molded under the influence of heat and pressure, the synthetic elastomer may be further heat treated in an oven until the desired degree of cure is obtained.

The amount of aliphatic azo compound added to the elastic or convertible organopolysiloxane depends to some extent on the desired characteristics of the cured product. Generally the aliphatic azo compound is used in amounts ranging from about 0.1 to 10% or more, by weight, preferably from about 0.5 to 4%, by weight, based on the weight of the convertible organopolysiloxane, for example, the highly viscous curable or solid elastic curable hydrocarbon-substituted polysiloxane. Although larger amounts of catalyst may be employed, the amount employed as a curing agent ordinarily should not exceed about 6%, particularly where the finally cured product will be continuously subjected to elevated temperatures.

Among the fillers which may be employed in this invention may be mentioned inorganic fillers, for example, lithopone, ferric oxide, titanium dioxide, talc, zinc oxide, etc. Various forms of silica and silica aerogel may also be employed if desired. The aforementioned fillers may be incorporated in the convertible organopolysiloxane in amounts ranging from about 10 to 90% or higher, preferably from about 25 to 75% of the total weight of the filler and the elastic product. In order that those skilled in the art may better understand how the present invention may be practiced, the following examples are given by way of illustration and not by way of limitation. All parts are by weight.

EXAMPLE

A solid, elastic, rubbery polymerized methyl-substituted polysiloxane was prepared by hydrolyzing dimethyl dichlorosilane containing about 0.15 mol per cent methyl trichlorosilane, and thereafter condensing the formed liquid, oily non-resinous methyl polysiloxane with ferric chloride hexahydrate in the same manner as disclosed in the aforementioned Agens patent to give a solid, elastic, heat-convertible dimethyl polysiloxane.

About 100 parts of the above prepared solid, elastic methyl polysiloxane was milled on differential rubber rolls for about one-half hour with 200 parts TiO₂ and 0.5 to 2%, by weight, based on the weight of the solid elastic methyl polysiloxane of 2-azo-bis-isobutyronitrile. The amount of the aliphatic azo compound was varied and samples were molded to determine the effect of the various concentrations of the aliphatic azo compound. The molded sheets in each case were molded between heated platens for about 20 minutes at 150° C. and thereafter heat-aged in an air circulating oven at about 200° C. The following table shows the results of this treatment.

Table

| Percent Cure Accelerator | After 16 Hours at 200° C.— | | After 96 Hours at 200° C.— | |
|---|---|---|---|---|
| | Tensile p. s. i. | Percent Elongation | Tensile p. s. i. | Percent Elongation |
| 0 | 148 | 100 | 101 | 100 |
| 0.5 | 193 | 100 | 252 | 130 |
| 1.0 | 197 | 120 | 242 | 130 |
| 2.0 | 214 | 140 | 251 | 130 |

The results in the table indicate that the heat-aging properties of the polysiloxane were essentially unchanged even after heating for 96 hours at 200° C. This is a remarkable advantage since the use of other vulcanization agents result in some decrease in properties after such a heating cycle.

It will of course be apparent to those skilled in the art that other aliphatic azo compounds many examples of which have been given before, as well as other organopolysiloxanes convertible to the solid elastic state may be employed in place of the azo compound and methyl polysiloxane described in the foregoing example. In addition, the concentration of the aliphatic azo compound as well as filler content (as well as the filler itself) may be varied without departing from the scope of the invention. It is desired to point out that the foregoing example illustrates clearly the vulcanizing or heat curing effect of the aliphatic azo compound as compared to the effect produced where the aliphatic azo compound is omitted. It will be apparent that by varying the type of organopolysiloxane, the filler as well as concentration of filler, the type of aliphatic azo compound and concentration of aliphatic azo compound, and by varying the method of preparing the organopolysiloxane convertible to the heat-cured, solid, elastic state, products having a variety of properties improved over those disclosed in the above-identified example may be obtained.

The synthetic silicone elastomers prepared and vulcanized in accordance with our invention are capable of withstanding elevated temperatures (150° to 200° C.) for extended periods of time, and retain their desirable rubbery properties at temperatures as low as —50° to —60° C. Such properties make them highly useful as insulation material for electrical conductors, gasket material, shock absorbers, and for other applications for which known natural or synthetic rubbers have heretofore been employed.

What we claim as new and desire to secure by Letters Patent of the United States is:

1. A heat-convertible composition of matter comprising (1) a heat-curable polymerized hydrocarbon-substituted polysiloxane wherein the hydrocarbon radicals are selected from the class consisting of alkyl, aryl, aralkyl, and alkaryl radicals, and containing an average of from 1.95 to 2.1 hydrocarbon groups per silicon atom and (2) an aliphatic azo compound present, by weight, in an amount equal to from about 0.1 to 10% by weight of (1).

2. A heat-convertible composition of matter comprising (1) a polymerized methyl polysiloxane convertible to the solid elastic state containing an average from 1.98 to 2.0 methyl group per silicon atom, and (2) an aliphatic azo compound present, by weight, in an amount equal to from about 0.1 to 10% of the weight of (1).

3. A heat-convertible composition of matter comprising (1) a polymerized hydrocarbon-substituted polysiloxane convertible to the substantially infusible and insoluble solid elastic state wherein the hydrocarbon radicals are selected from the class consisting of alkyl, aryl, alkaryl and aralkyl radicals and containing an average of from 1.95 to 2.1 hydrocarbon groups per silicon atom, and (2) an aliphatic azo compound present, by weight, in an amount equal to from about 0.1 to 10% of the weight of (1) wherein the said azo compound corresponds to the general formula

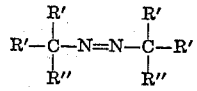

where R′ may be the same or different and is a member selected from the class consisting of hydrogen and monovalent hydrocarbon radicals, and R'' may be the same or different and is selected from the class consisting of hydrogen, monovalent hydrocarbon radicals, the cyano radical, —COOH radical, —COOCH$_2$R' radical where R' has the meaning given above, and —CONH$_2$ radical.

4. A heat-convertible composition of matter comprising (1) a solid elastic curable hydrocarbon-substituted polysiloxane consisting of silicon and oxygen atoms and methyl and phenyl radicals, the said methyl and phenyl radicals being bonded to the silicon atoms by carbon-silicon linkages and containing an average of from 1.98 to 2.0 total methyl and phenyl groups per silicon atom, and (2) from 0.1 to 10%, by weight, based on the weight of (1) of an aliphatic azo compound comprising 2-azo-bis-isobutyronitrile.

5. A heat-convertible composition of matter comprising (1) a solid, elastic, curable methyl polysiloxane containing an average of from 1.98 to 2.0 methyl groups per silicon atom bonded to the silicon atoms by carbon-silicon linkages and (2) from 0.1 to 10%, by weight, based on the weight of (1) of a vulcanization accelerator for (1) comprising 2-azo-bis-isobutyronitrile.

6. The method which comprises (1) incorporating an aliphatic azo compound into a heat-curable polymerized hydrocarbon-substituted polysiloxane wherein the hydrocarbon groups are attached to the silicon atoms by carbon-silicon linkages and are selected from the class consisting of alkyl, aryl, aralkyl, and alkaryl radicals, and containing an average of from 1.95 to 2.1 hydrocarbon groups per silicon atom, in an amount equal to from 0.1 to 6%, by weight, of the said polysiloxane, and (2) heating the resultant product thereby to accelerate the curing of said polysiloxane to an elastomeric product.

PHILIP A. DI GIORGIO.
MOYER M. SAFFORD.

REFERENCES CITED

The following references are of record in the file of this patent:

UNITED STATES PATENTS

| Number | Name | Date |
|---|---|---|
| 2,448,565 | Wright et al. | Sept. 7, 1948 |
| 2,471,959 | Hunt | May 31, 1949 |
| 2,481,052 | Warrick | Sept. 6, 1949 |